Oct. 26, 1943.  E. N. STROMMER  2,332,947

CONTROL APPARATUS

Filed March 19, 1942

INVENTOR.
Earl N. Strommer
By Green & McCallister
His Attorneys

Patented Oct. 26, 1943

2,332,947

UNITED STATES PATENT OFFICE 2,332,947

CONTROL APPARATUS

Earl N. Strommer, Wilkinsburg, Pa.

Application March 19, 1942, Serial No. 435,327

4 Claims. (Cl. 200—81)

This invention relates to circuit control devices and more particularly to circuit control devices capable of responding to changing conditions in the operation of opening and/or closing an associated electric circuit.

An object of this invention is to produce such a control device which may be easily and effectively adjusted to respond to variations from a desired condition in a medium or region to be controlled and which will then operate to maintain the desired condition with close limits.

A further object is to produce a control device and a method of adjusting the same such that a desired condition in a medium or region may be maintained, within the close limits, after such condition has been attained.

These and other objects which will be made more apparent throughout the further description of my invention are attained by means of apparatus such as is here illustrated and procedure such as is here defined.

In the drawing accompanying and forming a part hereof, Figure 1 is a diagrammatic view of circuit control apparatus, shown in association with a circuit to be controlled.

Figure 8:
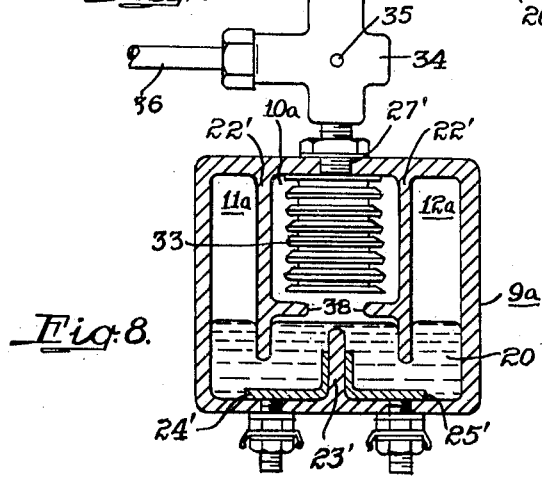

Figure 8 discloses a still further embodiment of my invention.

Figure 1:
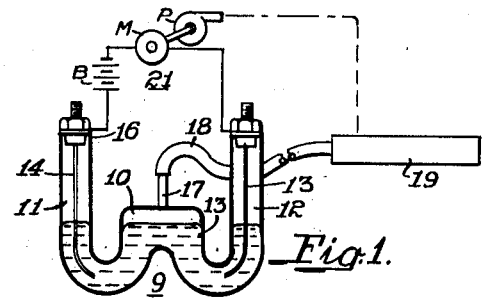
Figure 2:
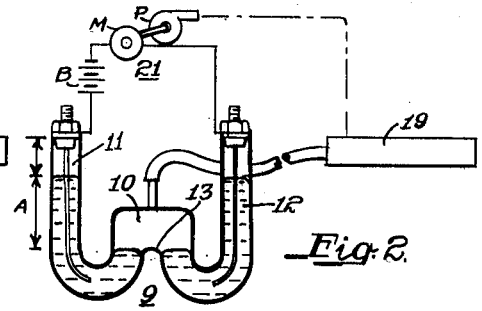
Figure 2 is a diagrammatic view, corresponding to Figure 1, except that it indicates a condition such that the associated electric circuit has been opened by the operation of the control device.
Figure 3:
Figure 3 is a diagrammatic view of the device illustrated in Figures 1 and 2 but turned to a position such that the pressures therein are equalized as a preliminary in adjusting the device for automatic operation.

Figures 1, 2 and 3 of the drawing are primarily adapted to illustrate the principle of my invention. As there shown, the device embodying my invention is a receptacle 9 so formed as to provide two substantially U-shaped chambers or tubes which merge into a central chamber or compartment and thus provide an association of compartments or passages which approximate a W in shape. The receptacle 9, illustrated in Figure 1, encloses a central chamber 10 and two U-shaped chambers or passages 11 and 12, which communicate with the bottom of the central chamber in such a way that a central ridge 13 extends transversely across the receptacle and, in effect, forms the bottom of the central chamber 10, marks the terminus of each of the U-shaped passages and thus forms a barrier which intervenes between the two U-shaped passages.

As illustrated, the receptacle 9 is provided with two terminals 14 and 15, one of which projects downwardly into and almost to the bottom of the U-shaped tube or chamber 11, whereas the other projects downwardly into and almost to the bottom of the U-shaped tube or chamber 12. Both the terminals 14 and 15 are so associated with the receptacle that the interior thereof may be hermetically sealed. For example, the terminal 14 may pass through a plug 16 which seals the upper end of the U-tube or chamber 11 and also forms a support for the terminal. A similar construction is illustrated in connection with the U-tube 12.

The central chamber 10 is shown provided with a port 17 surrounded by a tubular flange which may be placed in communication with a source of variable fluid pressure 19 by means of tubing 18. The communicating chambers 10, 11 and 12 are also shown partially filled with a current-conducting liquid 20 such, for example, as mercury and, as illustrated in Figure 1, the mercury provides an electrical connection for the terminals 14 and 15 and, therefore, closes an electric circuit which is diagrammatically illustrated at 21.

The body of mercury moves in response to variations in fluid pressure within the receptacle and in Figure 2, I have shown the mercury divided into two bodies or columns which are separated by the intermediate ridge or barrier 13 and are, therefore, so located within the receptacle 9 that the chamber 10 is empty, except for the gaseous medium contained therein. This separation of the mercury 20 into two bodies results from a preponderance of fluid pressure within the chamber 10, breaks the electrical connection between the terminals 14 and 15 and thereby opens the control circuit 21.

It will be apparent that the pressure conditions are such within the receptacle 9 that fluid pressure within the chamber or compartment 10 equals that within the upper end of the chamber 10 or compartment 11 plus the pressure exerted by a column of mercury having a length equal to A, i. e., a length equal to the difference between the level of the mercury in the chamber 10 terminus of the U-tube or chamber 11 and the level of the mercury within the upper end of the tube 11. Correspondingly, the fluid pressure in the chamber 10 bears the same relationship to the fluid pressure above the mercury in the upper end of the U-tube 12.

Where a device, such as illustrated, is employed to respond to and therefore regulate the pressure in a receptacle, such as the receptacle 19, the chamber 10 may be placed in communication with the receptacle in which the pressure is to be controlled—i. e., the receptacle 19—by some means, such as tubing 18 and the hollow tip or flanged port 17, and the controlled circuit 21 furnishes operating current to the motor (or the control for the motor) which actuates the pressure generating means for supplying pressure to the receptacle 19. Where the control device functions as a thermostat to control temperature, then the fluid pressure within the receptacle 19 responds to variations in the temperature of the region or medium to be controlled, for example, the temperature around the receptacle 19, and the control circuit 27 furnishes actuating current to a motor or other device which actuates a mechanism capable—through its operation—of occasioning variations in the amount of heat delivered to the receptacle 19 or the region around that receptacle.

One of the features of my invention is the provision of means for readily adjusting the pressures within the receptacle 9, i. e., the cooperating pressures within the chambers or compartments 10, 11 and 12, so that the control device will automatically function to maintain a predetermined or desired condition in some medium or in a region such as the region within or immediately surrounding the receptacle 19. In order to accomplish this, the receptacle 9 is so mounted that it may be turned to a position, such as illustrated in Figure 3, in which the mercury 20 spreads out and partially fills all the chambers 10, 11 and 12 and, therefore, places those chambers in direct communication with each other. This equalizes the fluid pressure in all the chambers and it may either make or break the electrical connection between the terminals 14 and 15.

While the receptacle 9 is so positioned, the controlled apparatus (associated with the control circuit 21) is operated to produce the desired condition in the medium or at the region to be controlled. That is to say, if the device illustrated in Figures 1, 2 and 3 is to function as a pressure-control device for the receptacle 19, then the pressure-generating means is actuated while the receptacle 9 is turned to the position shown in Figure 3 and until the desired pressure condition is accomplished within the receptacle 19. As soon as this occurs, the receptacle 9 is "righted" (turned to the upright position illustrated in Figures 1 and 2) and because of the equalized fluid pressure within the chambers 10, 11 and 12, the mercury 20 within the receptacle 9 will assume the position illustrated in Figure 1, i. e., a position in which each of the chambers 10, 11 and 12 is separated from the other two chambers by the intervening body of mercury 20 and in which the fluid pressure above the mercury is equal in each of the chambers 10, 11 and 12. It will be apparent that this condition will continue to exist—independently of the degree of pressure within the receptacle 19 and consequently above the mercury in chambers 10, 11 and 12—until the pressure changes in the receptacle 19.

It will also be apparent that the pressure so adjusted within the chamber 10 will vary with variations in pressure within the receptacle 19 and that, therefore, the body of mercury 20 will fluctuate and tend to equalize pressure conditions within the receptacle 9 for every change of pressure within the receptacle 19.

Thus, a decrease in pressure within the chamber 19 below the equalized pressures of the chambers 10, 11 and 12 will occasion a movement of mercury from the U-tubes 11 and 12 toward the central chamber 10. A continuation of such a movement will unite the two mercury columns and close the control circuit 21. On the other hand, an increase in pressure within the receptacle 19 will occasion a like increase within the chamber 10 and mercury will be forced out of that chamber and into the U-tubes 11 and 12 until the pressure equilibrium is again established in the receptacle 9. At some such increased pressure, the pressure conditions within receptacle 9 will cause the mercury to move to the position illustrated in Figure 2 with a resultant opening of the control circuit 21.

Figure 4:
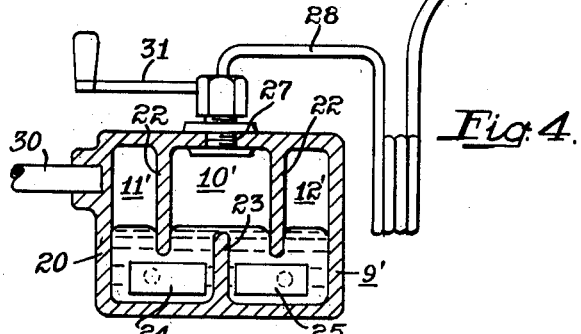
Figure 4 is a sectional view of a modified form of device embodying my invention shown associated with a source of variable fluid pressure in which the variations may be occasioned by variations in temperature or by the operation of pressure-producing mechanisms.

In Figure 4, I have diagrammatically illustrated a more rugged form of device. There the receptacle 9' is provided with two depending barriers 22 which, with an upwardly projecting barrier 23, divide the interior of the receptacle 9' into compartments approximating the central chamber 10 and the two U-shaped chambers 11 and 12 of Figures 1 and 2. I have also employed the reference characters 10', 11' and 12' to indicate corresponding chambers or compartments. It will, of course, be understood that the partitions or barriers 22 and 23 extend clear across the interior of the receptacle 9' transversely thereof and that the barrier 23 projects upwardly from and is preferably integral with the bottom of the receptacle 9' and forms a barrier corresponding to the barrier or rib 13 of Figures 1 and 2.

Terminals 24 and 25 are secured to one side wall of the receptacle 9', are located on opposite sides of the upwardly projecting barrier 23 and are located well below the upper edge of that barrier. These terminals correspond to the terminals 14 and 15 and, as shown, are located well below the lower edges of the barriers 22. They are a part of a control circuit such as the circuit 21. The interior of the receptacle 9' is partially filled with a conducting liquid, such as mercury 20, or is filled to such a level that the barrier 23 is normally completely submerged within the mercury and the barriers 22 project downwardly below the level of the mercury, thus isolating each of the compartments 10, 11 and 12 from the others.

It will be apparent that the apparatus illustrated in Figure 4 is capable of functioning as described in connection with the apparatus of Figures 1 and 2 in response to variations in pressure occasioned within the chamber 10. As illustrated, the casing of the receptacle 9' is provided with a port corresponding to the port 17 of Figure 1 and is illustrated as equipped with a fitting capable of producing a hermetic seal between the receptacle 9' and a tube 28 which may establish communication between the receptacle 9' and a receptacle 29 which corresponds to the receptacle 19 heretofore commented upon.

Thus it is apparent that changes in fluid pressure within the receptacle 29 will occasion changes in fluid pressure within the compartment 10' and will thus cause movements in the body of mercury 20 and under conditions such that an increasing fluid pressure will cause mercury to move downwardly out of compartment 10' and upwardly into compartments 11' and 12'. When such movement progresses to the point that the level of the mercury in the compartment 10' is below the upper edge of the barrier 23, the electrical connection between the terminals 24 and 25 is broken and the associated control circuit is, therefore, opened. Likewise, a decreasing pressure within the receptacle 29 (and consequently within compartment 10') will cause a movement of mercury in the opposite direction and—at some pressure—the mercury will again submerge the barrier 23 and thus electrically connect the terminals 24 and 25 and close the control circuit.

It will, of course, be apparent that the casing of both the receptacles 9 and 9' will be formed of some dielectric material, such, for example, as a heat-resistant glass, and that the barriers 22 and 23 of the casing 9' (and particularly the barrier 23) will be formed of dielectric and heat-resistant material so that a division of the body of mercury 20 into two bodies or columns, as heretofore described, will break the electrical connection between the associated terminals but will not burn or otherwise damage the barrier 23.

It will also be apparent to those skilled in the art that the apparatus illustrated in both Figures 1 and 4 is adapted to function in connection with what is termed a normally closed circuit. Each such apparatus, however, may be readily adapted for use with a normally open circuit by a rearrangement of the fluid pressure connections. For example, the receptacle 9 of Figure 1 may be provided with two ports in place of the port 17. Where such a rearrangement is resorted to, each of the two ports will be located adjacent the top of one of the chambers or tubes 11 and 12 so that, instead of imparting variations in fluid pressure to the chamber 10 as described, pressure variations will be imparted to both of the chambers 11 and 12. Under such conditions, the proportioning of the chambers 10, 11 and 12 will be such that the mercury within the receptacle 9 will normally be in the form of two separated columns but will move into the chamber 10, to unite the two columns, in response to increasing pressure within the chambers 11 and 12 above the level of the mercury contained therein.

A similar arrangement of ports may also be employed in connection with the receptacle 9', of Figure 4, so that the two compartments 11' and 12' of receptacle 9' may be placed in communication with the receptacle 29 and thus cause mercury to move into the compartment 10' as the pressure in receptacle 29 increases, and out of the compartment 10' as the pressure in receptacle 29 decreases.

In Figure 4, I have more or less diagrammatically shown a trunnion 30 which is secured to the casing of the receptacle 9' and which may constitute a support therefor. Where the casing is so supported the receptacle can be tilted to any one of the three positions illustrated in Figures 5, 6 and 7 for the purpose of shifting the position of the mercury body and of readjusting the pressure conditions within the interior of the casing. It will be noted that when the receptacle 9' is turned to the position illustrated in Figure 5, the mercury 20 moves out of contact with the terminals 24 and 25 and occupies a position such that free and open communication is established between the chambers or compartments which are normally separated by the cooperative action of the mercury and the depending barriers 22, which compartments have been referred to as compartments 10', 11' and 12'. It will, therefore, be apparent that when the receptacle is turned to the position shown in Figure 5, the fluid pressures within these compartments are not only equalized but the circuit, associated with the terminals 24 and 25, is broken. Under such conditions, the apparatus controlled by the control circuit will not only be thrown out of operation but—as above stated—the pressure conditions within the various compartments of receptacle 9' will be equalized.

Figure 6:
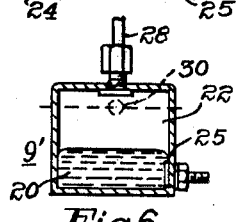
Figure 6 is a view corresponding to Figure 5 in which the control device is turned to a position such that the pressure chambers or compartments thereof are separated, one from another, by a body of current-conducting liquid, such, for example, as mercury.

If it is assumed that the fluid pressure within the associated receptacle 29 is decreasing, a righting of the receptacle 9' at the instant some definite fluid pressure is reached or established, will adjust the control device to respond to variations from that definite pressure and thus control apparatus such as is generally referred to in connection with the description of Figures 1, 2 and 3, as associated with the control circuit 21. Figure 6 illustrates the receptacle 9' in the "righted" position.

Figure 7:
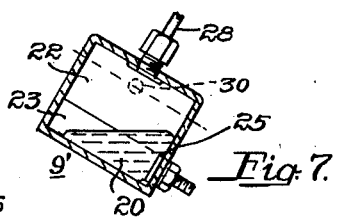
Figure 7 is a view corresponding to Figures 5 and 6 except that the device is turned to a pressure-equalizing position in which the current-conducting liquid closes the associated control circuit.

In Figure 7, the receptacle is turned so that the mercury again permits free and open communication between the compartments 10', 11' and 12' but in this position the mercury constitutes an electrical connection between the terminals 24 and 25 and thus closes the associated control circuit. Under these conditions, the control circuit will function to occasion a change in the medium or region to be controlled, e. g., the region surrounding the container 29 and this in turn will occasion a change in the pressure within the receptacle 9'. Again, when a definite and desired pressure is reached or established, the receptacle 9' will be righted and thus adjust the control device to respond to variations from the definite or predetermined pressure. The receptacle 9' may be provided with means such as a handle 31 for the purpose of turning it to and holding it in the positions illustrated in Figures 5, 6 and 7.

Figure 8 illustrates a still further modification of apparatus embodying my invention. As there illustrated, the apparatus is particularly adapted to be employed as a part of a thermostatic control mechanism, i. e., as a part of apparatus for automatically controlling temperature of a medium or at some point or place.

As shown, the apparatus includes a receptacle 9a similar to the receptacle 9' and provided with two depending barriers 22' which, with a body of mercury 20, divide the interior of the receptacle into compartments 10a, 11a and 12a. The receptacle is also provided with an upwardly extending barrier 23' similar in location and function to the barrier 23 of Figure 4 and terminals 24' and 25' are secured to the interior of the receptacle 9a on opposite sides of the barrier 23'.

Instead of establishing direct communication between the interior of the receptacle 9a and some receptacle, such as the receptacle 19 of Figure 1, I have shown the receptacle 9a provided with a pressure exchange device 33 in the form of a Sylphon bellows. As shown, the bellows is located within the compartment 10a and is supported by the casing of the receptacle 9a. Its interior is also connected to capillary tubing 28' by means of a two-position valve 34.

The valve 34 is diagrammatically illustrated as provided with an atmospheric discharge or vent port 35, and a stem for manipulating the valve to either open or close the vent port and thus either establish communication between the interior of the bellows and the atmosphere or shut off such communication. It will be understood that the capillary tubing 28' communicates with the interior of a receptacle or capsule corresponding to the receptacle 19 of Figure 1 and that such capsule, the capillary tubing 28' and the Sylphon bellows constitute a closed pneumatic system when the valve 34 is closed. Again, it will be understood that the capsule will be subjected to the temperature to be controlled and that variations in that temperature will cause variations in the pressure within the closed system and thus cause the pressure transfer device to expand and/or contract. Such movements of the bellows 33 will occasion pressure variations within the casing 9a and fluctuations in the level of the mercury within the various compartments of that receptacle. Such fluctuations in mercury level will accomplish the making and breaking of a control circuit as described in connection with the apparatus of Figures 1 and 2 and also the apparatus of Figure 4, and thus may be employed in controlling the delivery of heat to the capsule communicating with the tubing 28'.

When it is desired to adjust the control device, including the receptacle 9a, and the associated mechanisms so that it will maintain—within close limits—a predetermined temperature, the valve 34 is opened to vent the interiors of the pressure transfer device 33, the capillary tube 28' and the associated capsule to atmosphere and thus establish a normal pressure condition within the receptacle 9a in which the body of mercury 20 is as illustrated in Figure 8. The temperature of the controlled region or container is then raised or lowered (as conditions may demand) until the predetermined temperature is obtained.

The capsule, corresponding to the receptacle 19, is subjected to the changes in temperature that are to be controlled and when the predetermined temperature is obtained, the valve 34 is closed, thus trapping air at atmospheric pressure within the pressure transfer device 33, the capillary tubing 28' and the associated capsule. Under such conditions, a continued increase in temperature will raise the pressure within this closed system and consequently extend the bellows 33, thus increasing the fluid pressure in the compartment 10a and upsetting the equilibrium of pressures within the compartments 10a, 11a and 12a, with the result that the body of mercury will fluctuate and will break the control circuit of which the terminals 24' and 25' form a part. In this way, the functioning of heat-creating mechanisms is controlled for the purpose of varying the heat input to the medium or region with which the capsule 19 is directly associated.

The casing of the receptacle 9a will be made of some heat-resistant, dielectric material and where mercury is employed as the current-conducting liquid, a neutral atmosphere, such as a hydrogen atmosphere, will be maintained within the receptacle to prevent oxidation or other deterioration of the mercury. The terminals 24' and 25' will also be made of such metal as does not amalgamate with mercury or will be so coated as to avoid such an attack by the mercury. In the drawing, the barriers 22' are shown with projections positioned so as to form a stop for the bellows 33 and to thereby prevent over-expansion of the bellows.

In Figures 1 and 2, the control circuit 21 is necessarily diagrammatically shown. The source of electrical energy is conventionally illustrated by the battery B, the condition-changing mechanism is conventionally illustrated as a pump P and this mechanism is conventionally shown as driven by a motor M. It will, of course, be apparent that where the control apparatus is adapted to be maintained a predetermined pressure, the mechanism P will be a pressure creating mechanism such as a centrifugal pump. I have, therefore, diagrammatically indicated the mechanism P as operatively connected to the receptacle 19 for the purpose of indicating the delivery of fluid under pressure to the receptacle 19.

It will, however, be understood that where the control apparatus is employed for the purpose of controlling temperature, the mechanism P will be such as will contribute to an increase in the heat delivered to the medium or region subjected to temperature control. That is to say, the mechanism P may be a heat source or some heat-creating auxiliary such as a draft-creating blower, a stoker-actuating mechanism, a fuel-delivery mechanism, or some equivalent equipment. Under such circumstances, the receptacle 19 will be considered as the capsule 19, i. e., an element subjected to and responding to the heat delivered or created by the operation or the cooperative action of the mechanism P. It will also be understood that while I have illustrated the circuit 21 as the main power circuit, it may be and usually will be the source of energy for a relay device or some such auxiliary which merely controls the delivery of power to the mechanism P.

From the foregoing, it will be apparent that my invention involves broadly and specifically the procedure of controlling the operation of a condition-changing mechanism (mechanism P and its operating instrumentality M) so as to create a predetermined condition, then rendering the control device (the instrumentality 9, 9' or 9a) operative to respond to variations from the predetermined condition and in thereupon controlling the condition-changing mechanism in response to changes from such predetermined condition in the operation of maintaining such predetermined condition substantially constant.

Figure 5:
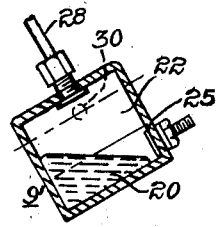
Figure 5 is a transverse sectional view (on a reduced scale) of the control device illustrated in Figure 4 and turned to a pressure-equalizing position in which the associated electric circuit is open.

By way of example and with reference to Figures 4, 5, 6 and 7, if it is assumed that the condition-changing mechanism is pressure-creating mechanism, and if it is also assumed that the condition to be maintained substantially constant is the pressure within a receptacle such as the receptacle 19, then the predetermined condition to be maintained substantially constant, may be obtained within the receptacle 19 by either causing the condition-changing mechanism to deliver pressure to said receptacle or by relieving the pressure therein. In either case, when the predetermined pressure is attained, the control device is rendered operative and capable of responding to variations from the predetermined pressure. With reference to Figures 5, 6 and 7, it may be said that the control device 9' is righted (see Figure 6), when the predetermined pressure is reached, and is thereby rendered operative to control the operation of the condition-changing mechanism in response to variations from such predetermined pressure and whether or not the control is effected directly or indirectly by the circuit of which the terminals 24 and 25 form a part.

The device illustrated in Figure 8 is rendered operative or inoperative as an automatic control device for the condition-changing mechanism by the simple operation of closing or opening the atmospheric vent 35. When the vent is open, the bellows 33 adjusts itself to atmospheric pressure and normally creates a condition within the receptacle 9a, such as is illustrated, wherein the terminals 24' and 25' are electrically connected by the body of liquid 20 and the control circuit is, therefore, closed. It will, however, be apparent that some separate means, such as a manually controlled switch, may be employed for controlling the circuit 21 when the automatic control device is rendered inoperative.

It will be understood that the apparatus disclosed as embodying my invention is primarily illustrative and that various changes, including additions and omissions, may be made therein without departing from the spirit and scope of my invention as defined by the appended claims.

What I claim is:

1. A pressure responsive control device comprising a receptacle having compartment-forming barriers and an additional barrier located therein, a conducting liquid within said receptacle normally submerging said additional barrier and normally separating the compartments of the receptacle one from the other, electric terminals located within said receptacle on opposite sides of said additional barrier, fluid pressure means communicating with one of the compartments of said receptacle for occasioning variations in the fluid pressure within such compartment to cause fluctuations in said liquid and to thereby make and break electrical contact between said terminals and means for actuating said receptacle to shift said liquid and thereby place the compartments of the receptacle in open communication with each other.

2. A pressure responsive control device, comprising a receptacle, a conducting liquid located within said receptacle, partially filling the same and dividing the interior thereof into separate compartments, two electric terminals located in spaced relation within said receptacle and normally submerged by said liquid, fluid pressure means communicating with one of the compartments of said receptacle to vary the pressure therein and thereby cause fluctuations of said liquid to make and break electrical contact between said terminals and means for actuating said receptacle to shift said liquid out of contact with said terminals and to place the compartments of said receptacle in open communication with each other.

3. A pressure responsive control device, comprising a receptacle, a conducting liquid located within said receptacle, partially filling the same and dividing the interior thereof into separate compartments, two electric terminals located in spaced relation within said receptacle and normally submerged by said liquid, means communicating with one of such compartments of said receptacle for delivering variations in fluid pressure thereto to cause fluctuations of said liquid to make and break electrical contact between said terminals and means for actuating said receptacle to shift said liquid and place the compartments thereof in open communication with each other.

4. A pressure responsive control device comprising a receptacle having compartment-forming barriers and an additional barrier located therein, a conducting liquid within the receptacle and normally submerging said additional barrier and normally cooperating with said compartment-forming barriers to separate the interior of the receptacle into compartments and to isolate one from the other, electric terminals located within said receptacle on opposite sides of said additional barrier, fluid pressure means communicating with said receptacle for occasioning variations in the fluid pressure within one of the compartments thereof to cause fluctuations in said liquid and to make and break electrical contact between said terminals and means for actuating said receptacle to shift said liquid therein and render it ineffective to make and break the electrical contact between said terminals and to place the compartments of said receptacle in open communication with each other.

EARL N. STROMMER.